United States Patent [19]

Redlich et al.

[11] Patent Number: 4,814,047

[45] Date of Patent: Mar. 21, 1989

[54] METHOD FOR PRODUCING A PRERECORDED DISK-SHAPED DIE

[75] Inventors: Horst Redlich; Gunter Joschko, both of Berlin, Fed. Rep. of Germany

[73] Assignee: DMM Master Technik GmbH fur Informationstrager, Berlin, Fed. Rep. of Germany

[21] Appl. No.: 12,899

[22] Filed: Feb. 10, 1987

[30] Foreign Application Priority Data

Feb. 11, 1986 [DE] Fed. Rep. of Germany ....... 3604237

[51] Int. Cl.$^4$ ............................................. C25D 1/10
[52] U.S. Cl. ......................................... 204/5; 204/20; 204/35.1; 204/38.4
[58] Field of Search ................ 204/5, 20, 29, 30, 35.1, 204/38.4; 369/127

[56] References Cited

U.S. PATENT DOCUMENTS

| | | | |
|---|---|---|---|
| 4,402,798 | 9/1983 | Gorog et al. | 204/5 |
| 4,469,563 | 9/1984 | Hakala | 204/5 |
| 4,474,650 | 10/1984 | DeLaat | 204/5 |

OTHER PUBLICATIONS

F. A. Lowenheim, Electroplating, McGraw-Hill Book Co., New York, 1978, p. 171.

Primary Examiner—John F. Niebling
Assistant Examiner—William T. Leader
Attorney, Agent, or Firm—Burns, Doane, Swecker & Mathis

[57] ABSTRACT

A method for producing a prerecorded disk-shaped die is specified in which the information signal is recorded onto a metallic recording medium. According to the invention, the information carrier layer consisting of base metal is first vapor-deposited onto a glass base. Then the information signal is recorded onto the surface of the information layer with the aid of a cutting or stamping tool. Following this, a metallic interlayer of precious metal is galvanized on, onto which another base layer particularly of metal, is then galvanized. After the glass base has been mechanically separated, the information carrier layer can then simply be removed by a chemical medium which does not attack the interlayer. The method according to the invention is particularly suitable for producing dies for digital sound recording according to the compact disk process.

11 Claims, 1 Drawing Sheet

METHOD FOR PRODUCING A PRERECORDED DISK-SHAPED DIE

BACKGROUND OF THE INVENTION

The invention relates to a method for producing a pre-recorded, disk-shaped die. The invention also relates to a pre-recorded, disk-shaped die and to a blank information carrier.

It is already known from analog audio disk engineering to cut information signals into metallic recording media and to cast dies directly from this medium. This method developed by the applicant and known as so-called Direct Metal Mastering (DMM) is characterized by high fidelity of shape in the galvanic duplicating process and that several intermediate stages are dispensed with in producing an audio disc.

Analog sound recording is afflicted with fundamental problems which have largely become controllable due to the development of the art. Digital recording of an information signal with subsequent optical laser-readout has also gained a considerable market share in recent years. In this method, the digital signal is usually recorded onto a recording medium by means of complicated optical and chemical processes. The so-called CD's (compact disks (CD's) copied from this are distinguishable by their good acoustical characteristics and by the fact that they can be scanned by a laser in contactless manner.

Handling a CD is simpler for the consumer than handling a conventional record since the surface of a CD is relatively insensitive. The contactless scanning inherent in laser use provides further advantages.

However, the production of a CD is incomparably more complicated than the production of an analog record. The facilities used in the prior art require the use of "super-clean rooms" so there is no risk of dust particles impairing the production process of a disk in an inadmissible manner. The CD master is usually produced in the following manner: A glass plate polished to a high gloss is first subjected to a visual check and then is cleaned and provided with an adhesive layer. A photoresist layer $0.1\mu$ thick is applied to the adhesive layer. This $0.1\mu$ of thickness corresponds exactly to the $0.1\mu$ depth of the signal track on the finished CD to enable the signal track to be read out by a laser beam. The coated glass plate is then checked again and adjusted. This is followed by the recording of the information signal by laser beam so that the locations of exposure can subsequently be washed out in the developing process. The washing out process is continued under laser beam control until the desired pit structure has been achieved. The developed photoresist layer is subsequently provided with a thin silver layer to enable a carrier material to be galvanized on. After the galvanizing is completed, the glass base and the non-exposed photoresist layer can be removed, making the final die (master) and available which in the conventional manner provide the possibility of copying for further processing in subsequent stages.

The plurality of method steps and the complexity of the facilities for checking the desired signal shape necessitate a costly production method which sensitively responds to disturbances, dust particles in the atmosphere and inaccurate method parameters.

OBJECTS AND SUMMARY OF THE INVENTION

The invention is based on the object of specifying a method which considerably simplifies the production of dies, particularly those for digital audio disk recording suitable for laser readout, obviates several intermediate stages of the production in accordance with the prior art, and, overall, provides the possibility of improved recording quality. A further object consists of specifying pre-recorded dies and blank information carriers which are insensitive and which are capable of being stored and have good recording characteristics.

The invention makes it possible to specify a method for matrixing a digital audio recording without the use of a laser beam and without the photoresist lacquer technique. The information signal directly stamped or cut into a recording layer can be galvanically cast and further processed and copied after a base has been applied.

The construction of the sandwich produced by the specified method consists only of metallic layers. These metallic layers allow a much better fidelity of shape and stamping than is possible when using lacquer layers of photoresist layers.

According to the invention, an information carrier layer, preferably of copper, is vapor-deposited onto a glass base, preferably after the application of a separation layer of tin bronze. The information signal is then directly recorded onto this information carrier layer. Another metal layer, preferably of gold, and on top of a base material, preferably of nickel, is then galvanically applied to this information carrier layer. The glass base can then be easily mechanically separated from the sandwich, and can be used again.

Although the separated sandwich cannot be directly used for duplicating but forms at this point an intermediate stage thereto, this intermediate stage is particularly suitable for storage and for transport since it offers no access whatsoever to the information signal of the information carrier layer. This is because the region containing the information is embedded in metal layers on both sides.

Since the information carrier layer preferably consists of copper, to which an interlayer of precious metal, preferably gold or platinum, is applied, the recording layer can be removed in a simple ferric chloride bath without the precious metal layer being attacked. Because of the direct galvanic casting on the information carrier layer, the precious metal layer is a faithful replica of the recorded signal structure. Copies (female dies or stamping dies) can then be made of this master die. However, the master die can also be used directly as a stamping die.

BRIEF DESCRIPTION OF THE DRAWINGS

In the text which follows, the invention is explained in greater detail with the aid of an illustrative embodiment.

DETAILED DESCRIPTION OF THE PREFERRED EMBODIMENT

Figure 1:
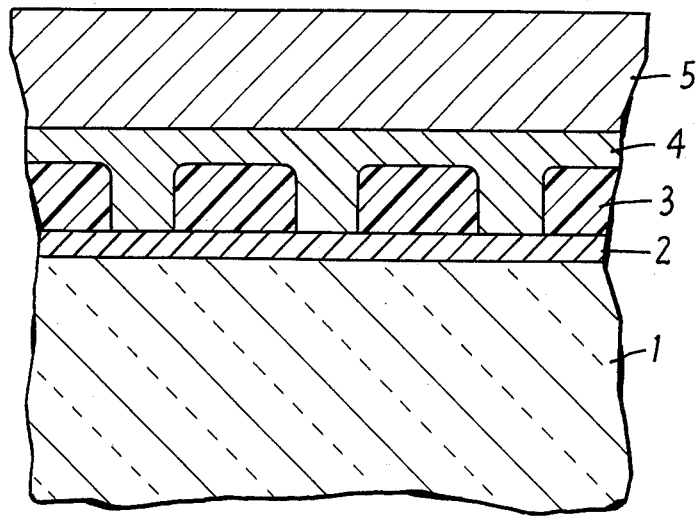
FIG. 1 shows a matrix in accordance with the prior art, in cross-section.

The layer structure of a die according to the prior art is shown in FIG. 1 (not true to scale). Firstly, an adhesive layer 2 is applied to a highly polished glass base 1 and is followed by a photoresist layer 3. The photoresist layer is applied in a thickness of 0.1μ. The information signal is exposed into this photoresist layer by a laser beam so that a structural change occurs at the locations of the exposure such structural changes capable of being washed out in the subsequent developing process. After the photoresist layer has been removed at the exposed locations, a silver layer 4, which produces the necessary conductivity of the surface for the galvanic accumulation of the nickel layer 5, must be applied before the nickel base can be applied because of the lack of conductivity of the photoresist layer.

The glass base can then be separated from the photoresist layer so that the remaining photoresist layer is removed by suitable solvents from the glass base together with the adhesive layer and from the silver layer 4, respectively. The signal recording is now available as negative in raised shape and can be duplicated in subsequent galvanizing stages.

The adhesive layer 2 essentially has two tasks. On the one hand, the adhesive layer provides the photoresist layer with a better adhesive base, compared with the glass so that a subsequent application of a nickel layer and the resulting stresses caused by this do not cause a separation of the photoresist layer. On the other hand, the adhesive layer prevents penetration to the glass surface when the silver layer 4 is applied since the silver layer would otherwise adhere to the glass surface.

Dies produced by this method are relatively susceptible to faults resulting in a high rejection rate.

Figure 2:
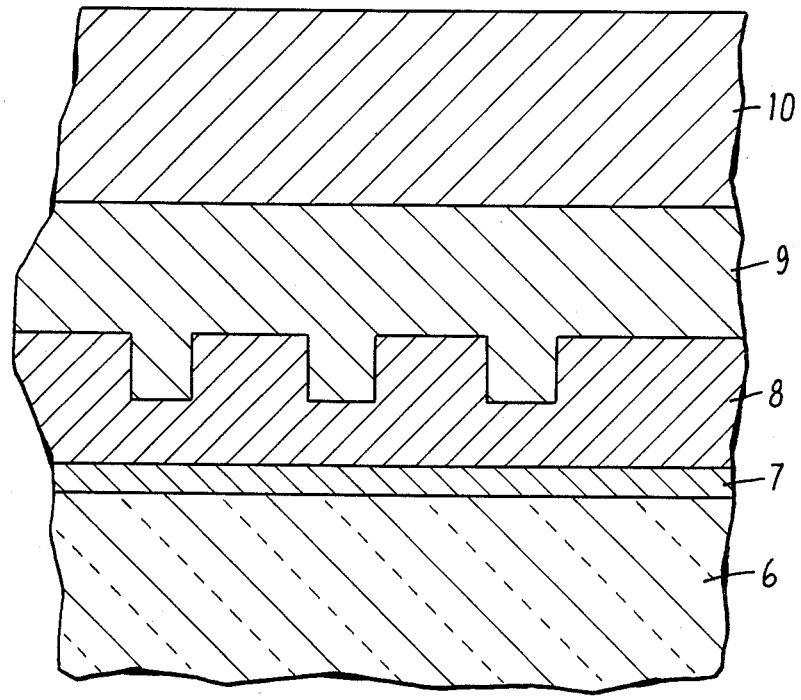
FIG. 2 shows a matrix according to the invention, in cross-section.

FIG. 2 shows a section through a die according to the invention in a cross-sectional representation which is not true to scale. Firstly, a thin tin bronze layer about 20 mm thick is vapor-deposited in a high vacuum onto a glass base 6 6-8 mm thick. A pure copper layer about 100-300 mm thick is vapor-deposited thereonto in a high vacuum. The copper applied in this manner is sufficiently ductile to enable an information signal to be cut in or stamped in the copper.

Such a blank information carrier can now be clamped into a recording facility. The information signal is then stamped or cut in with the aid of a diamond tool. Methods and devices for recording an information signal, which are suitable for stamping a signal into an information carrier according to the invention, are specified in German Pat. No. 3,527,606.

The recording of the information signal is followed by the galvanic application of preferably a gold layer having a thickness of about 5 μm. The gold layer 9 completely levels the cut in information pits. Complete protection of the recording is already achieved at this stage. Subsequent to this, the base layer 10 of nickel can now be galvanically applied. The nickel layer of a thickness of 0.2 mm serves as carrier material for the recorded information. In this condition, the sandwich can be stored over a long period but the glass plate can also be first removed along the tin bronze layer 7 for further use. The tin bronze layer 7 enables the sandwich to be easily mechanically separated from the glass plate. It also ensures adequate adhesion of the information carrier layer to the glass plate. The sandwich is preferably stored or transported in this intermediate stage (without the glass base). The surface of the recording layer cannot be damaged in this stage.

As soon as the die is used for further processing, the copper layer used for cutting or stamping in the information can be etched off in a simple ferric chloride bath. To obtain better solubility of the tin bronze layer, it is preferable to add some hydrochloric acid is preferably added to this bath. A suitable formulation of such a bath contains 50 g $FeCl_3 \times 6H_2O$, 25 ml (HCl (25%), 11 $H_2O$.

Since the ferric chloride bath cannot attack the interlayer 9 of precious metal, consisting of gold or platinum or another precious metal, it is only the copper layer which is etched away. The recorded information signal therefore appears in the gold layer without any mechanical damage or change in shape. The copper layer is completely removed by the ferric chloride bath.

As a result of this measure, a complete cast of the copper layer 8 is obtained in the gold interlayer 9. This, together with the nickel base 10, can then be used as a master die for further copying or can also be used directly as a stamping die.

Stamping or cutting the information signal into the copper layer 8 enables a high degree of accuracy to be achieved. It also means that the reliability of recording is very high in the range of resolution used so that the rejection rate can be kept very low.

At the same time, the direct recording of the information signal by mechanical means allows a signal check to be performed, for example, with the aid of a laser beam, even while the recording is being made so that the presence of any faults in the recording can be immediately detected. Thus, no subsequent developing process is required for checking. This results in high reliability and saves time needed for producing such a die.

In contrast to the laser photoresist technique, the recording process does not need any clean room conditions. The galvanic process steps required for the specified method can also be performed under the conditions of purity hitherto normal in record technology.

Etching the cutting layer away from the gold layer offers the particular advantage that no mechanical separation must be performed at the cutting layer, thus avoiding stress problems and damage which can occur during the matrixing of analog records.

Compared with the cutting layer 8, the separation layer 7 displays good adhesion so that no residues remain on the glass base when the glass base is separated from the die.

To carry out the principle according to the invention, basically all materials of base metal suitable for cutting or stamping can be used as the information layer onto which layers of precious metal are then galvanized. The etching away of the base metal does not attack the remaining layer of precious metal.

It can also be considered to be of special advantage that the error rate already determined during the recording no longer changes in the subsequent galvanization step and remains constant until the information layer is separated from the precious metal layer, resulting in an extremely insensitive intermediate stage of matrixing. This intermediate stage is particularly suitable for the transport or storage of a die before copies are made of it.

| List of reference numbers: | |
| --- | --- |
| 1 | Glass base |
| 2 | Adhesive layer |
| 3 | Photoresist layer |
| 4 | Silver layer |
| 5 | Nickel base |
| 6 | Glass base |
| 7 | Separation layer |
| 8 | Information carrier layer |

| List of reference numbers: | |
|---|---|
| 9 | Interlayer |
| 10 | Recording carrier |

I claim:

1. Method for producing a pre-recorded, disk-shaped die in which the information signal is recorded on a metallic information layer, comprising the steps of:
   (a) vapor-depositing metal onto a glass base to define an information carrier layer;
   (b) recording an information signal on the surface of the information carrier layer with the aid of a cutting or stamping chisel creating a sequence of indentations in the surface of the information carrier;
   (c) electrolytically depositing a metallic interlayer, the chemical composition of which deviates from the information carrier layer, onto the information carrier layer completely leveling the indentations in the surface of the information carrier layer;
   (d) electrolytically depositing a metallic base layer onto the interlayer;
   (e) separating the sandwich formed from the information carrier layer, interlayer and base layer from the glass base, the information carrier layer protecting the interlayer from damage; and
   (f) chemically dissolving the information carrier layer by a medium which does not attack the interlayer.

2. Method as in claim 1, including the step of providing the glass base with a separation layer before the information carrier layer is vapor-deposited.

3. Method as in claim 2, wherein the separation layer consists of metal and including the step of dissolving the separation layer after the sandwich has been separated from the glass base.

4. Method as in claim 3, wherein the separation layer consists of vapor-deposited tin bronze.

5. Method as in claim 3, wherein the information carrier layer and the separation layer together are dissolved in the same chemical medium and are removed by this means.

6. Method as in claim 5, wherein the chemical medium is a ferric chloride bath with an addition of hydrochloric acid.

7. Method as in claim 1, wherein the interlayer consists of precious metal.

8. Method as in claim 7, wherein the interlayer consists of gold, rodium or platinum or of a precious metal alloy.

9. Method as in claim 1, wherein the information carrier layer consists of copper or of a copper alloy.

10. Method as in claim 1, wherein the base layer consists of nickel.

11. Method as in claim 1, wherein the information signal is recorded in the form of a sequence of indentations having a variable length and spacing but having essentially constant depth and width.

* * * * *

UNITED STATES PATENT AND TRADEMARK OFFICE
CERTIFICATE OF CORRECTION

PATENT NO. : 4,814,047
DATED : March 21, 1989
INVENTOR(S) : Horst Redlich and Gunter Joschko It is certified that error appears in the above-identified patent and that said Letters Patent is hereby corrected as shown below:

Column 1, lines 26 and 27, delete "so-called CD's (".

Column 1, line 46, delete "of".

Column 1, line 49, delete "adjusted" and insert --fixed-- therefor.

Column 1, line 61, delete "and" and "which".

Column 1, line 62, before "provide" insert "to".

Column 3, line 6, following "exposure" insert --,--, a comma.

Signed and Sealed this

Fifth Day of June, 1990

*Attest:*

HARRY F. MANBECK, JR.

*Attesting Officer*     *Commissioner of Patents and Trademarks*